(12) United States Patent
Gupta et al.

(10) Patent No.: US 12,395,830 B2
(45) Date of Patent: Aug. 19, 2025

(54) METHOD AND SYSTEM FOR IMPROVING PLMN SELECTION BASED ON REQUIRED SERVICES/ SLICES FOR ROAMING SUBSCRIBERS

(71) Applicant: Samsung Electronics Co., Ltd., Suwon-si (KR)

(72) Inventors: Varini Gupta, Bangalore (IN); Anikethan Ramakrishna Vijaya Kumar, Bangalore (IN); Kundan Tiwari, Bangalore (IN); Lalith Kumar, Bangalore (IN); Rajavelsamy Rajadurai, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/799,542

(22) PCT Filed: Feb. 15, 2021

(86) PCT No.: PCT/KR2021/001875
§ 371 (c)(1),
(2) Date: Aug. 12, 2022

(87) PCT Pub. No.: WO2021/162503
PCT Pub. Date: Aug. 19, 2021

(65) Prior Publication Data
US 2023/0107525 A1    Apr. 6, 2023

(30) Foreign Application Priority Data

Feb. 14, 2020  (IN) ............................ 202041006520
Feb. 9, 2021  (IN) ............................ 2020 41006520

(51) Int. Cl.
*H04W 8/06* (2009.01)
*H04W 48/18* (2009.01)
*H04W 60/00* (2009.01)

(52) U.S. Cl.
CPC ............. *H04W 8/06* (2013.01); *H04W 48/18* (2013.01); *H04W 60/00* (2013.01)

(58) Field of Classification Search
CPC ........ H04W 8/06; H04W 48/18; H04W 60/00
(Continued)

(56) References Cited

U.S. PATENT DOCUMENTS

| 10,397,892 B2 | 8/2019 | Vrzic et al. |
| 2019/0174449 A1 | 6/2019 | Shan et al. |
| 2019/0313238 A1* | 10/2019 | Palanigounder ........ H04W 8/20 |

FOREIGN PATENT DOCUMENTS

EP    3 993 462 A1    5/2022

OTHER PUBLICATIONS

3rd Generation Partnership Project; Technical Specification Group Core Network and Terminals; Non-Access-Stratum (NAS) functions related to Mobile Station (MS) in idle mode (Release 16), 3GPP TS 23.122, vol. CT WG1, No. V16.4.0, Dec. 19, 2019, pp. 1-80.

Nokia et al., KI: Area of service: impact on PLMN selection in roaming, S2-2001468, SA WG2 Meeting #136-AH, Jan. 16, 2020, Incheon, Korea.

Apple, KI #8, New Sol: Support of S-NSSAI-aware PLMN selection in roaming scenarios, S2-2003734, SA WG2 Meeting #139E, XP051890385, May 23, 2020, Elbonia.

(Continued)

*Primary Examiner* — Joel Ajayi
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure relates to a method and system for steering of roaming (SoR) information based on required services for roaming subscribers. The method includes registering the UE in a visited public land mobile network (VPLMN) by (Continued)

an access and mobility management function (AMF) device. The method comprises requesting a unified data management (UDM) server of a home public land mobile network (HPLMN) to provide subscription data. The method further comprises requesting by the UDM server SoR information from an application function (AF) device, wherein the request includes information related to single-network slice selection assistance information (S-NSSAI) either requested or subscribed by the UE. The method comprises the steps of determining the SoR information to be provided to the UDM server and transmitting the SoR information to the UE. The subscribers can use the SoR information for latching onto a VPLMN that provides the service they are interested in.

8 Claims, 4 Drawing Sheets

(58) Field of Classification Search
USPC ...................................................... 455/435.2
See application file for complete search history.

(56) References Cited

OTHER PUBLICATIONS

European Search Report dated Jun. 2, 2023, issued in European Application No. 21754491.5.
Motorola Mobility, Lenovo; Solution to KI#1, KI#2 and KI#4 on monitoring multiple quotas of network slice attributes at NWDAF; SA WG2 Meeting #S2-136AH; S2-2001651; Jan. 17, 2020, Incheon, South Korea.
Tencent; AF Requested TSN Synchronization Activation and Deactivation; SA WG2 Meeting #S2-136AH; S2-2001662; Jan. 20, 2020, Incheon, South Korea.
InterDigital; Cleanups on introduction of pending Nssai; 3GPP TSG-CT WG1 Meeting #122-e; C1-200318; Feb. 13, 2020, Electronic meeting.
3GPP TS 23.122 V16.4.0; 3rd Generation Partnership Project; Technical Specification Group Core Network and Terminals; Non-Access-Stratum (NAS) functions related to Mobile Station (MS) in idle mode (Release 16), Dec. 19, 2019.

* cited by examiner

[Fig. 1a]
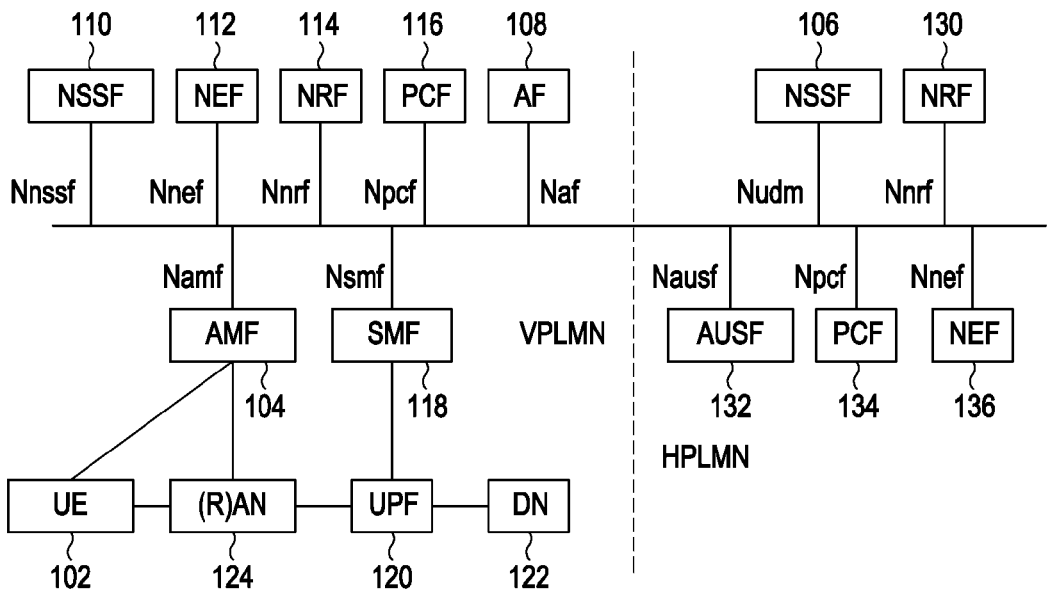
[Fig. 1b]
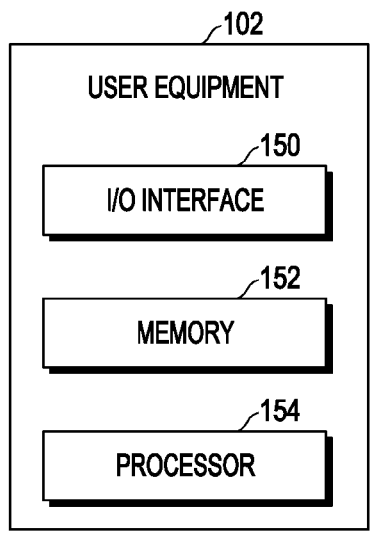

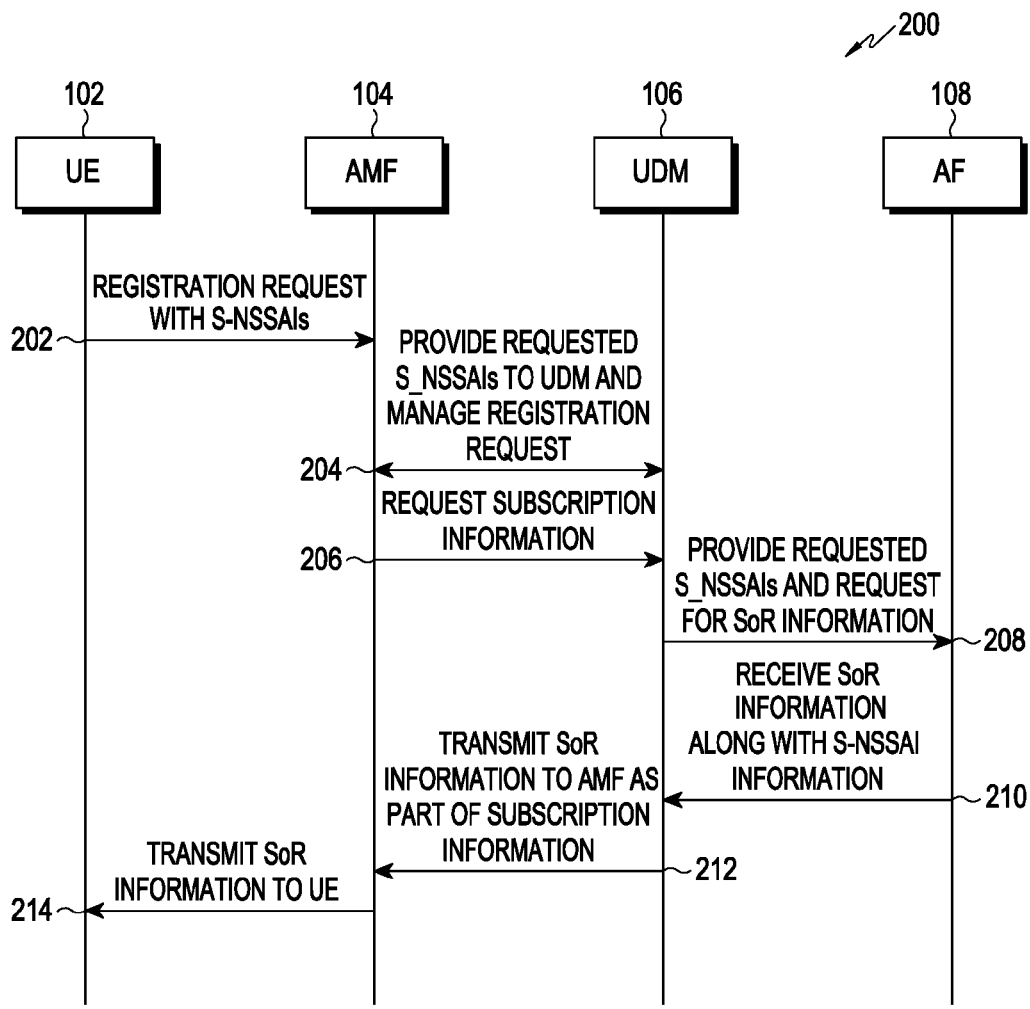
[Fig. 2]

[Fig. 3]
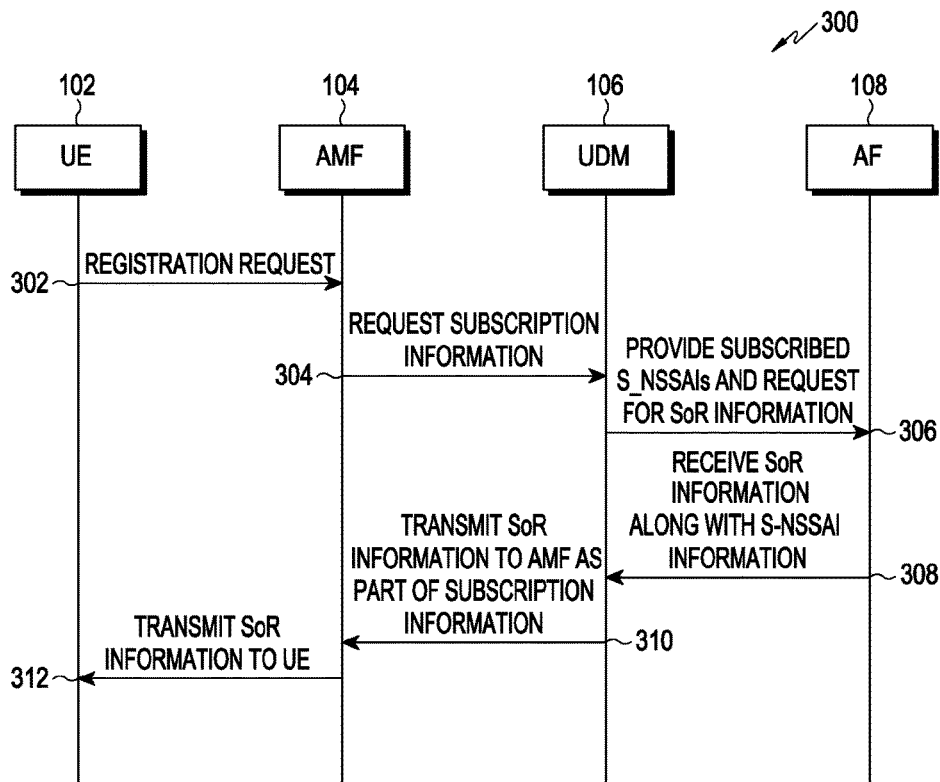
[Fig. 4]
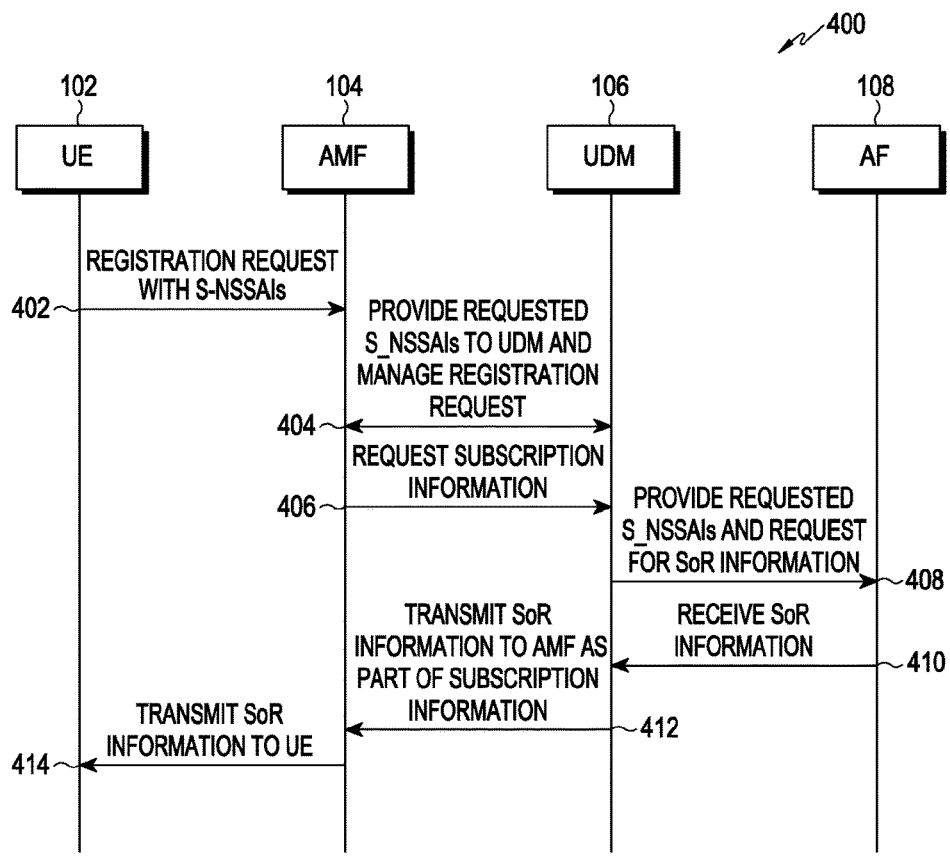

[Fig. 5]
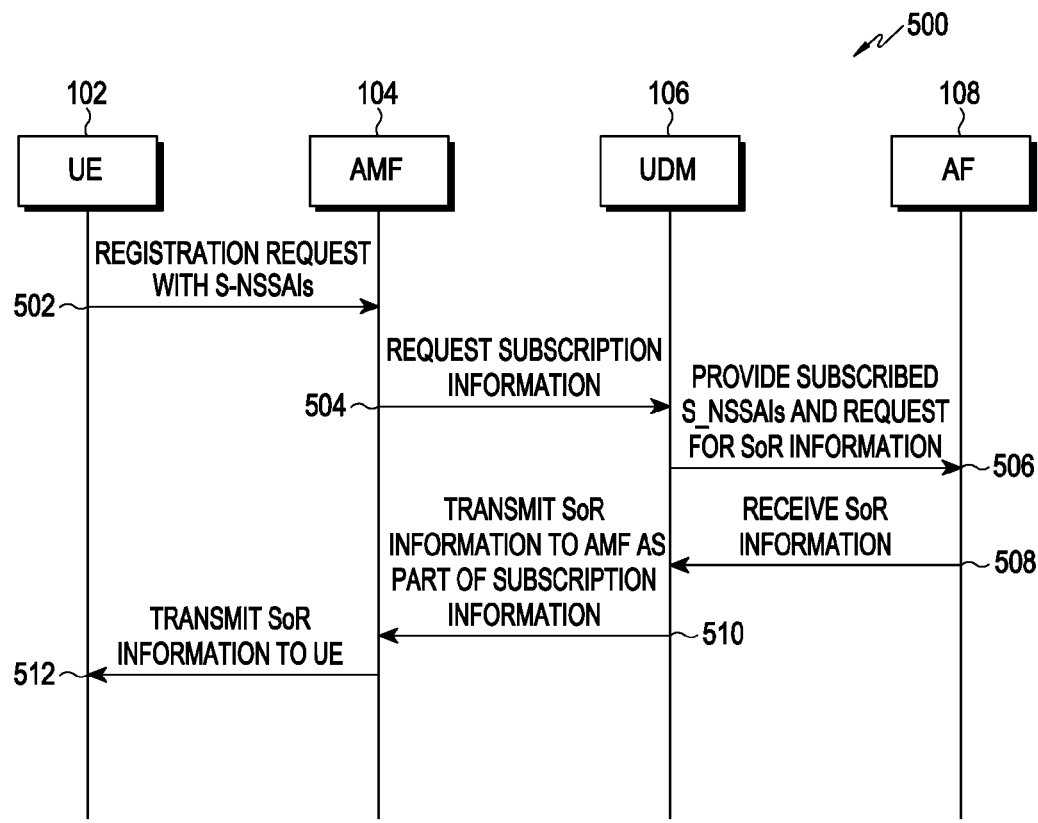

METHOD AND SYSTEM FOR IMPROVING PLMN SELECTION BASED ON REQUIRED SERVICES/ SLICES FOR ROAMING SUBSCRIBERS

CROSS-REFERENCE TO RELATED APPLICATION(S)

This application is a U.S. National Stage application under 35 U.S.C. § 371 of an International application number PCT/KR2021/001875, filed on Feb. 15, 2021, which is based on and claimed priority of an Indian Provisional patent application number 202041006520, filed on Feb. 14, 2020, in the Indian Intellectual Property Office, and of an Indian Complete patent application number 202041006520, filed on Feb. 9, 2021, in the Indian Intellectual Property Office, the disclosure of each of which is incorporated by reference herein in its entirety.

TECHNICAL FIELD

The present subject matter relates to the field of telecommunications. More particularly, the present subject matter relates to identifying and selecting networks by one or more subscribers depending on their service requirements.

BACKGROUND ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The mobile telecommunication has gained huge importance across the globe in recent years due to rapid economic growth and advancement in cellular technologies and cellular networks. With growing demand, numerous attempts have been made to improve different functional areas of mobile communications to meet the increasing needs of the consumers. Accordingly, group of the standards organizations like 3GPP ($3^{rd}$ Generation Partnership Project) introduced plurality of protocols for mobile telecommunications based on generations such as 3G, 4G, 5G etc. Network slicing is a key 5G concept introduced to provide specific and dedicated connectivity services to consumers over networks provided by network service providers. 5G introduces a network slice selection function (NSSF), which assists consumers in selecting a network slice. 5G also introduces the concept of network slice selection assistance information (NSSAI) to assist slice selection. The NSSAI consists of a list of single NSSAIs (S-NSSAIs). A network, such as a public land mobile network (PLMN), combines different 5G core network elements to deliver much more flexible types of network slices (i.e., NSSAIs) in real time. The subscribers in a network can use the Network Slice as long as the corresponding S-NSSAI is part of their subscription which is stored in unified data management (UDM).

Each PLMN provides different set of services i.e., S-NSSAIs to respective consumers and there may be differences between the services provided by different PLMNs. Therefore, roaming subscribers often face problems with required services in visited networks as the subscribers' have no idea whether the services (S-NSSAI) preferred/utilized by the subscribers are provided by one or more PLMNs in the visited network. Consequently, the roaming subscribers have to perform PLMN selection (which may be aided by steering of roaming (SoR) information) and register to the network of that PLMN in order to verify whether the required services are supported by the selected PLMN in the visited network. Such process of verifying the available services in the visited network by switching between PLMNs is quite tedious and a kind of trial-and-error technique, thereby requires significant effort and time.

The information disclosed in this background of the disclosure section is only for enhancement of understanding of the general background of the invention and should not be taken as an acknowledgement or any form of suggestion that this information forms the prior art already known to a person skilled in the art.

DISCLOSURE OF INVENTION

Solution to Problem

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of providing Steering of Roaming (SoR) information to a user equipment (UE). The method includes registering the UE in a visited public land mobile network (VPLMN) by a serving access and mobility management function (AMF) device. The method comprises requesting a unified data management (UDM) server of a home public land mobile network (HPLMN) to provide the subscriber's subscription data. The method further comprises requesting by the UDM Server SoR information from an application function (AF) device, wherein the request includes information related to one or more single-network slice selection assistance information (S-NSSAI). The method comprises the steps of determining the SoR information to be provided to the UDM Server based upon the request from the UDM server and transmitting the SoR information to the UE.

Further, the disclosure relates to a system for providing steering of roaming (SoR) information to a user equipment (UE). The system comprises the UE, an access and mobility management function (AMF) device, a unified data management (UDM) server, and an application function (AF) device. The AMF device is configured to register the UE in a visited public land mobile network (VPLMN) and request the UDM server of a home public land mobile network (HPLMN) to provide the subscriber's subscription data. The UDM Server is configured to request SoR information from the AF device, wherein the request includes information related to one or more single-network slice selection assistance information (S-NSSAI). The AF device is configured to determine the SoR information to be provided to the UDM Server and transmit the SoR information to the UE.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1a illustrates a 5G telecommunications network in which a user equipment (UE) operates in a roaming network in accordance with some embodiments of the present disclosure;

FIG. 1b illustrates an exemplary representation of the user equipment (UE) in accordance with some embodiments of the present disclosure;

FIG. 2 illustrates a proposed call flow for derivation of SoR information based on requested S-NSSAIs, in accordance with one embodiment of the present disclosure;

FIG. 3 illustrates a proposed call flow for derivation of SoR information based on subscribed S-NSSAIs, in accordance with one embodiment of the present disclosure;

FIG. 4 illustrates a proposed call flow for derivation of SoR information having list of PLMNs based on requested S-NSSAI, in accordance with one embodiment of the present disclosure; and FIG. 5 illustrates a proposed call flow for derivation of SoR information having list of PLMNs based on subscribed S-NSSAI, in accordance with one embodiment of the present disclosure.

It should be appreciated by those skilled in the art that any step diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

MODE FOR THE INVENTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and system of providing SoR information to a user equipment (UE). The method includes registering the UE in a visited public land mobile network (VPLMN) by a serving access and mobility management function (AMF) device. The method comprises requesting a unified data management (UDM) server of a home public land mobile network (HPLMN) to provide the subscriber's subscription data. The method further comprises requesting by the UDM Server (106) SoR information from an application function (AF) device, wherein the request includes information related to one or more single-network slice selection assistance information (S-NSSAI). The method comprises the steps of determining the SoR information to be provided to the UDM Server (106) based on received request from the UDM server and transmitting the SoR information to the UE. The SoR information includes one of a prioritized list of available PLMNs and a combination of a prioritized list of available PLMNs and respective S-NSSAI information that enables the UE to latch onto suitable network.

The mobile communication service carrier may assign suitable network resources to one or more subscriber for the corresponding service per slice. The network resources may mean network functions (NFs) or logical resources or radio resource allocations provided by the network functions (NFs).

The 3GPP has defined a new method for steering of roaming (SoR) for 5G in order to mitigate many of the issues of existing methods of SoR for legacy systems. The 5G SoR solution enables a home network operator to steer roaming customers to respective preferred VPLMN networks to enhance roaming customers' experience and reduce roaming charges.

Network slicing is a concept for 5G core network. Network slicing is a technology which bundles network resources and network functions necessary for one or more services requested by a user equipment (UE) into a single independent slice. The one or more services include but not limited to enhanced mobile broadband (eMBB), ultra reliable low latency communications (URLLC), massive internet of things (mIoT) etc. Network service providers may make independent allocations of network resources specified for each service and user by network slicing. The concept of network slicing is the use of network virtualization to divide single network connections into multiple distinct virtual connections that provide different amounts of resources to different types of traffic. Network slicing enables the most economical model to provide service differentiation and meeting end user service-level agreements (SLA). The network slicing provides opportunity to new types of service offerings and support different enterprise business models, in a flexible way with a high service deployment velocity. Network slicing overlays multiple virtual networks on top of a shared network. Each slice of the network can have its own logical topology, security rules and performance characteristics within the limits imposed by the underlying physical networks. Different slices can be dedicated to different purposes, such as ensuring a specific application or service gets priority access to capacity and delivery or isolating traffic for specific users or device classes. Therefore, the concept of network slicing enables the network operator to maximize the use of network resources and service flexibility.

A public land mobile network (PLMN) is the area of land covered by a network operator for voice and data services to a mobile subscriber. The PLMN connects to other PLMNs for providing inter operators roaming services. The home PLMN of a mobile subscriber is called home public land mobile network (HPLMN), which has subscription profiles of plurality of subscribers. A mobile operator may have multiple PLMNs in a country with a different mobile network code or MCC. A visiting public land mobile network (VPLMN) is a PLMN upon which the mobile subscriber has roamed when leaving respective HPLMN. The VPLMN and HPLMN can be the same or different, depending upon the location of the mobile phone and the serving mobile operator. A mobile operator has VPLMN based changing and roaming policies.

The PLMN provides several network slices, and each network slice may be provided to the UE in the form of a slice instance. For example, the PLMN includes one or more slice instances. Each slice instance may include network resources necessary to provide the corresponding network slice. Each slice is uniquely identified by a single-network slice selection assistance information (S-NSSAI).

A network slice selection function (NSSF) maintains a list of the network slice instances defined by an operator, including their definitions, such as required resources. A UE may be configured with a list of subscribed network slices and can request these during the registration procedure. The AMF authorizes the use of the network slices using subscription information from a UDM server or by a query to the NSSF.

FIG. 1a illustrates a 5G system architecture in which a user equipment (UE) operates in a roaming network in accordance with some embodiments of the present disclosure.

The 5G system architecture may include, as network elements, a user equipment (UE) (102) in a roaming network, an access and mobility management function (AMF) device (104), a unified data management (UDM) server (106), an application function (AF) device (108) inside a core network. In the 5G system architecture, a plurality of functions, connection points, or protocols can be defined for the plurality of network functions (NF) as illustrated in FIG. 1a.

The plurality of network functions (NFs) may include an authentication server function (AUSF) (132), the access and mobility management function (AMF) (104), a network exposure function (NEF) (136), a network repository function (NRF) (130), a policy control function (PCF) (134), a session management function (SMF) (118), the unified data management (UDM) (106), a user plane function (UPF) (120), the application function (AF) (108), and a network slice selection function (NSSF) (110), wherein each of the NFs can be configured in respective processing device residing at one of a VPLMN and a HPLMN as illustrated in FIG. 1a. Each of the respective processing device can include a memory, and a processor coupled with the memory in order to execute plurality of instruction with respect to the associated network function.

In the disclosure, the AMF, UDM, and AF may play a key role in establishing a UE-initiated registration to a suitable VPLMN providing requested or subscribed services of a roaming subscriber.

The UE (102) is any device used directly by an end-user to communicate over a network. The UE (102) can be implemented in various forms. For example, as disclosed herein, the UE (102) may be, e.g., a mobile phone, a smartphone, a laptop computer, a digital broadcast terminal, a portable digital assistant (PDA), a portable media player (PMP), or a navigation device. As disclosed herein, the UE may also include an electronic device.

The UE (102) typically comprises an I/O interface (150), a memory (152), and a processor (154) as illustrated in FIG. 1b. The I/O interface (150) is configured to receive configurations and any other information from a network device. The configurations and other information received by the I/O interface (150) are stored in the memory (152). The memory (152) further stores data related to various functions as performed by the UE (102). The memory is communicatively coupled to the processor (154) of UE (102) and stores processor executable instructions that causes the processor (154) to execute the instructions for dynamically performing a network selection procedure. The UE (102) accesses a network to receive a service from at least one of the several slice instances simultaneously or sequentially.

The UE (102) receives the services of a PLMN typically completely from the serving operator's administrative domain. Home-routed data services are the alternative for roaming scenarios, which also have network functions from the home operator's administrative domain.

The UE (102) interfaces a data network (DN) (122) via a radio access network (RAN) (124) in a VPLMN while roaming and a HPLMN of the roaming UE enables such interfacing with subscription information from the UDM Server (106), authentication server function (AUSF) (132) and UE specific policies from policy control function (PCF) (116). The VPLMN provides network slice selection function (NSSF) (110), access control and mobility management function (AMF) (104), and application functions (AF) (108).

The UE (102) initiates registration procedure in the VPLMN by sending registration request to the AMF device (104) of the VPLMN. The registration request can include connection and session related information, one or more S-NSSAIs etc., wherein the one or more requested S-NSSAIs are the S-NSSAIs that are either provided by or mapped to the HPLMN of the UE (102).

The AMF device (104) is configured to receive the connection and session related information from the roaming UE and provide access and mobility management functionality independently of access technology. The AMF device (104) can also receive information related to S-NSSAIs requested by the roaming UE. The primary tasks of the AMF device (104) include registration management, connection management, reachability management, mobility management, and various functions relating to security, access management, and authorization. The AMF device (104) supports establishing encrypted signalling connection towards the roaming UE, allowing the UE to register, to be authenticated, and to move between different radio cells in the network. The AMF device (104) can be configured to provide services to other functions, policy control functions (PCF), short message service function (SMSF), location management function (LMF), gateway mobile location centre (GMLC) and network exposure function (NEF) via respective service-based interfaces. The AMF device (104) includes security anchor functionality that supports authentication and authorization of the UE (102) in cooperation with the authentication server function (AUSF) (114) and the UDM Server (106). The AUSF stores data for authenticating the UE (102).

The AMF device (104) manages the UE registration request by using UE context management service (UECM) provided by the UDM server. The UECM service provides a network function (NF) consumer information related to a UE's serving NFs and status, allows a NF consumer to register and deregister itself as serving the UE, and allows an NF consumer to update some UE context information in the UDM. Thus, the AMF device (104) receives information related to the UDM Server (106) serving the UE (102), validates subscription information of the UE (102) from the UDM Server (106) and registers the presence of UE (102) in a VPLMN. In one embodiment, the AMF device (104) includes information related to one or more S-NSSAIs requested by the UE (102).

Additionally, the AMF device (104) requests the UDM server (106) to provide subscription data of the roaming subscriber by using subscriber data management service (SDM). The SDM service provides the requested data from an individual subscriber's subscription to a service consumer. Network functions (NFs) that consume SDM information can also subscribe to notifications sent by a Nudm producer when that information changes, wherein the NUDM is a service-based interface for the UDM server (106). The subscription information provided by the SDM service includes but not limited to data needed for network slice selection, UE registration, network access and mobility management, session management etc.

The UDM server (106) stores information about subscribers, application-specific data, and policy data. The UDM Server (106) interfaces with the AMF device (104) so that relevant data becomes available to the AMF device (104). The UDM server (106) generates authentication vectors when requested by the AUSF. The UDM server (106) uses subscription data to execute application logic like access authorization, registration management etc. The UDM server (106) also keeps track of which the AMF instance that is serving a specific UE. Different instances of the UDM server (106) can be used for same user in different transactions. The UDM server (106) acts as a service producer for five services Nudm_UEContextManagement, Nudm_SubscriberDataManagement, Nudm_UEAuthentication, Nudm_EventExposure, and Nudm_ParameterProvision. The UDM services are used by the AMF, SMF, SMSF, NEF, GMLC, and AUSF via the Nudm service-based interface.

The Nudm_UEContextManagement service is used for UE context management and allow NFs like the AMF, SMF and SMSF to register and deregister with UDM and can provide the NFs with information related to UE's e.g., a UE's serving NF identifier, UE status, etc. The Nudm_UEContextManagement Service is also known by a shorter version of the name, Nudm_UECM. The Nudm_SubscriberDataManagement service is used to manage subscription data and enables NFs like AMF and SMF to retrieve user subscription data and allows the UDM to provided updates of subscriber data. The Nudm_SubscriberDataManagement Service is also known as the Nudm_SDM service. The Nudm_UEAuthentication service provides authentication subscriber data to the e.g., AMF. For AKA based authentication, this operation can be also used to recover from security context synchronization failure situations. Used for being informed about the result of an authentication procedure with a UE. The Namf_EventExposure service allows NFs to subscribe to events and can provides monitoring indication of the events to the subscribed NF consumer. The Nudm_ParameterProvision service is used to provision information which can be used for the UE in 5G system.

In one embodiment, when the UE's (102) registration request includes one or more S-NSSAIs, the UDM server (106) performs subscription validation in order to determine whether the UE (102) is authorized to use one or more requested S-NSSAIs in the VPLMN or other VPLMNs. The UDM server (106) requests the AF device (108) to provide SoR information. The SoR information includes a list of preferred PLMNs in the visited roaming area and RAT (Radio Access Technology) information. The RAT is an underlying physical connection method for a radio-based communication network. The UE (102) can support several RATs such as Bluetooth, Wi-Fi, LTE, 5G etc. The request by the UDM server (106) further includes information related to S-NSSAIs either requested or subscribed by the UE (102).

In one embodiment, the AF device (108) determines the list of preferred PLMN that provides the one or more S-NSSAIs as requested or subscribed by the UE (102) based on configuration and stored information of the AF device (108). The AF device (108) also considers the UE's (102) service and business requirements in order to determine of the list of preferred PLMN. Upon determining the suitable SoR information, the AF device (108) transmits the SoR information to the UDM server (106). The SoR information includes one of a prioritized list of preferred PLMNs and a combination of a prioritized list of available PLMNs and respective S-NSSAI information based on the configuration of the UE (102). The respective S-NSSAI information is the information related to one or more S-NSSAIs as supported by each PLMN of the prioritized list of available PLMNs. In an example, a UE is configured to support selection of a PLMN from the list of preferred PLMNs and one or more S-NSSAIs with respect to a selected PLMN. In another example, a UE is configured to support selection of a PLMN from the list of preferred PLMNs.

The UDM Server (106) transmits the received SoR information to the AMF device (104) in response to the subscription request. Upon receiving the SoR information, the AMF device (104) generates a registration acceptance message based on the received SoR information and transmits the registration acceptance message to the UE (102) in response to the completion of registration of the UE (102) in a PLMN.

The following example call-flows and procedures described below are in detail, which describes how the information can be provided to the subscribers. In all the examples, certain aspects may be implemented within UDM itself. Also, the AF device (108) can modify the SoR information in the UE anytime by sending the information post registration procedure as well.

FIG. 2 illustrates an exemplary representation of the call flow where SoR information is derived based on requested S-NSSAIs.

As illustrated in FIG. 2, the call flow (200) comprises one or more steps implemented by the network elements for providing the UE a preferred list of PLMNs along with respective S-NSSAIs. The call flow (200) may be described in the general context of computer executable instructions. Generally, computer executable instructions can include routines, programs, objects, components, data structures, procedures, modules, and functions, which perform particular functions or implement particular abstract data types.

The order in which the call flow (200) is described is not intended to be construed as a limitation, and any number of the described method steps can be combined in any order to implement the call flow (200). Additionally, individual steps may be deleted from the call flow (200) without departing from the spirit and scope of the subject matter described herein. Furthermore, the call flow (200) can be implemented in any suitable hardware, software, firmware, or combination thereof.

At step (202), a registration request containing information related to one or more S-NSSAIs is received by an AMF device (104). A UE (102) initiates the registration procedure to register onto a suitable VPLMN by sending registration request to an AMF device (104) in a roaming network. The registration request includes, among other attributes, one or more S-NSSAIs requested by the roaming user. The requested S-NSSAIs correspond to one or more services either provided by or mapped to a respective HPLMN of the roaming user.

At step (204), the registration request is managed by the AMF device (104). The AMF device (104) performs initial validations as part of the registration. The validation procedure comprises authenticating the UE (102) and validating roaming information of the UE (102) based on received registration request from the UE (102). In one embodiment, the AMF device (104) registers the UE's presence in VPLMN by requesting a UDM server (106) of the UE (102) through user equipment context management (UECM) service, wherein the request includes one or more S-NSSAIs as requested by the UE (102). The UECM service provides information related to the UDM server (106) serving the roaming UE, validates subscription information of the roaming UE from the UDM server (106) and registers the presence of the UE (102) in the VPLMN.

At step (206), subscription data is requested from the UDM server (106). The AMF device (104) requests the UDM server (106) to provide subscription data of the roaming subscriber by using subscriber data management service (SDM). The SDM service provides the requested data from an individual subscriber's subscription to a service consumer. The subscription information provided by the SDM service includes but not limited to data needed for network slice selection, UE registration, network access and mobility management, session management etc.

At step (208), SoR information is requested by the UDM server (106) from an AF device (108). The UDM server (106) performs subscription validation in order to determine whether the UE (102) is authorized to use one or more requested S-NSSAIs in the VPLMN or other VPLMNs. The UDM Server (106) requests an AF device (108) to provide SoR information. In one embodiment, the request includes the UE's (102) requested S-NSSAIs.

At step (210), the SoR information is received at the UDM server (106). In one embodiment, the AF device (108) determines a list of preferred PLMNs that provide the one or more S-NSSAIs requested by the UE (102) based on configuration and stored information of the AF device (108). The AF device (108) also considers the UE's (102) service and business requirements in order to determine the list of preferred PLMNs. Upon determining the suitable SoR information, the AF device (108) transmits the SoR information to the UDM Server (106). The SoR information includes a prioritized list of available PLMNs and respective S-NSSAI information. The respective S-NSSAI information is the information related to one or more S-NSSAIs as supported by each PLMN of the prioritized list of available PLMNs.

At step (212), the SoR information is transmitted to the AMF device (104). The UDM server (106) transmits the received SoR information to the AMF device (104) in response to the subscription request.

At step (214), the SoR information is transmitted to the UE (102). Upon receiving the SoR information, the AMF device (104) generates a registration acceptance message based on the received SoR information and transmits the registration acceptance message and the SoR information to the UE (102). In one embodiment, the SoR information containing the list of preferred PLMNs and respective S-NSSAIs indicates to the UE (102) whether the current network is a preferred PLMN for the requested service.

Accordingly, if the current network does not provide the requested services, and/or is not the preferred network for the requested service, the UE may release the connection and perform PLMN search so that it can latch onto the best possible network. If the user wants to utilize another service i.e., S-NSSAI, the UE (102) can perform a mobility-registration procedure by providing a new set of S-NSSAIs during post initial-registration procedure. The UE further forwards information related to the new S-NSSAIs to the AF device (108) via the UDM Server (106) to get updated SoR information for new service-needs of the UE. Such mobility-registration procedure involves a fresh SDM service call, containing the newly requested S-NSSAI information.

FIG. 3 illustrates an exemplary representation of the call flow where SoR information is derived based on subscribed S-NSSAIs.

As illustrated in FIG. 3, the call flow (300) comprises one or more steps implemented by the network elements for providing the UE a preferred list of PLMNs along with respective S-NSSAIs. The call flow (300) may be described in the general context of computer executable instructions. Generally, computer executable instructions can include routines, programs, objects, components, data structures, procedures, modules, and functions, which perform particular functions or implement particular abstract data types.

The order in which the call flow (300) is described is not intended to be construed as a limitation, and any number of the described method steps can be combined in any order to implement the call flow (300). Additionally, individual steps may be deleted from the call flow (300) without departing from the spirit and scope of the subject matter described herein. Furthermore, the call flow (300) can be implemented in any suitable hardware, software, firmware, or combination thereof.

At step (302), a registration request of a UE (102) is received by an AMF device (104). The UE (102) initiates the registration procedure to register onto a suitable VPLMN by sending registration request to an AMF device (104) in a roaming network. The AMF device (104) performs initial validations as part of the registration. The validation procedure comprises authenticating the UE (102) and validating roaming information of the UE based on received registration request from the UE (102). The AMF device (104) registers the UE's presence in the VPLMN by requesting a UDM server (106) of the UE (102) through UECM service. The UECM service provides information related to the UDM server (106) serving the UE (102), validates subscription information of the UE (102) from the UDM Server (106) and registers the presence of the UE (102) in the VPLMN.

At step (304), subscription data is requested from the UDM server (106). The AMF device (104) requests the UDM server (106) to provide subscription data of the roaming subscriber by using subscriber data management (SDM) service. The SDM service provides the requested data from an individual subscriber's subscription to a service consumer. The subscription information provided by the SDM service includes but not limited to data needed for network slice selection, UE registration, network access and mobility management, session management etc. The network slice selection data includes one or more subscribed S-NSSAIs by the UE (102).

At step (306), SoR information is requested by the UDM server (106) from an AF device (108). The UDM server (106) performs subscription validation in order to determine whether the UE (102) is authorized to use one or more subscribed S-NSSAIs in the VPLMN or other VPLMNs. The UDM server (106) requests an AF device (108) to provide SoR information. In one embodiment, the request includes the UE's (102) subscribed S-NSSAIs.

At step (308), the SoR information is received at the UDM server (106). In one embodiment, the AF device (108) determines a list of preferred PLMN that provides the one or more S-NSSAIs as subscribed by the UE (102) based on configuration and stored information of the AF device (108). The AF device (108) also considers the UE's service and business requirements in order to determine the list of preferred PLMNs. Upon determining the suitable SoR information, the AF device (108) transmits the SoR information to the UDM Server (106). In one embodiment, the SoR information includes a prioritized list of available PLMNs and respective S-NSSAI information. The respective S-NSSAI information is the information related to one or more S-NSSAIs as supported by each PLMN of the prioritized list of available PLMNs.

At step (310), the SoR information is transmitted to the AMF device (104). The UDM server (106) transmits the received SoR information to the AMF device (104) in response to the subscription request.

At step (312), the SoR information is transmitted to the UE (102). Upon receiving the SoR information, the AMF device (104) generates a registration acceptance message based on the received SoR information and transmits the registration acceptance message and the SoR information to the UE in response to the completion of registration of the UE (102) in a PLMN. In one embodiment, the SoR information contains the list of preferred PLMNs and respective S-NSSAIs and indicates to the UE whether the current network is a preferred PLMN for the subscribed services.

If the current network does not provide the subscribed services, and/or is not the preferred network for the subscribed services, the UE (102) may release the connection and perform PLMN search so that the UE can latch onto the best possible network.

FIG. 4 illustrates an exemplary representation of the call flow where SoR information containing only preferred list of PLMN is derived based on requested S-NSSAIs.

As illustrated in FIG. 4, the call flow (400) comprises one or more steps implemented by the network elements for providing the UE a preferred list of PLMNs based on requested S-NSSAIs. The call flow (400) may be described in the general context of computer executable instructions. Generally, computer executable instructions can include routines, programs, objects, components, data structures, procedures, modules, and functions, which perform particular functions or implement particular abstract data types.

The order in which the call flow (400) is described is not intended to be construed as a limitation, and any number of the described method steps can be combined in any order to implement the call flow (400). Additionally, individual steps may be deleted from the call flow (400) without departing from the spirit and scope of the subject matter described herein. Furthermore, the call flow (400) can be implemented in any suitable hardware, software, firmware, or combination thereof.

At step (402), a registration request containing information related to one or more S-NSSAIs is received by an AMF device (104). A UE initiates the registration procedure to register onto a suitable VPLMN by sending registration request to an AMF device (104) in a roaming network. The registration request includes, among other attributes, one or more S-NSSAIs requested by the roaming user. The requested S-NSSAIs correspond to one or more services either provided by or mapped to a respective HPLMN of the roaming user.

At step (404), the registration request is managed by the AMF device (104). The AMF device (104) performs initial validations as part of the registration. The validation procedure comprises authenticating the UE (102) and validating roaming information of the UE (102) based on received registration request from the UE (102). In one embodiment, the AMF device (104) registers the UE's (102) presence in VPLMN by requesting a UDM server (106) of the UE (102) through UECM service, wherein the request includes one or more S-NSSAIs as requested by the UE (102). The UECM service provides information related to the UDM server (106) serving the roaming UE, validates subscription information of the UE (102) from the UDM server (106) and registers the presence of UE (102) in the VPLMN.

At step (406), subscription data is requested from the UDM server (106). The AMF device (104) requests the UDM server (106) to provide subscription data of the roaming subscriber by using subscriber data management (SDM) service. The SDM service provides the requested data from an individual subscriber's subscription to a service consumer. The subscription information provided by the SDM service includes but not limited to data needed for network slice selection, UE registration, network access and mobility management, session management etc.

At step (408), SoR information is received at an AF device (108). The UDM server (106) performs subscription validation in order to determine whether the UE (102) is authorized to use one or more requested S-NSSAIs in the VPLMN or other VPLMNs. The UDM server (106) requests an AF device (108) to provide SoR information. In one embodiment, the request includes the UE's (102) requested S-NSSAIs.

At step (410), the SoR information is received at the UDM server (106). In one embodiment, the AF device (108) determines a list of preferred PLMNs that provides the one or more S-NSSAIs requested by the UE (102) based on configuration and stored information of the AF device (108). The AF device (108) also considers the UE's service and business requirements in order to determine of the list of preferred PLMN. Upon determining the suitable SoR information, the AF device (108) transmits the SoR information to the UDM server (106). The SoR information contains a prioritized list of available PLMNs providing the requested S-NSSAIs.

At step (412), the SoR information is transmitted to the AMF device (104). The UDM server (106) transmits the received SoR information to the AMF device (104) in response to the subscription request.

At step (414), the SoR information is transmitted to the UE (102). Upon receiving the SoR information, the AMF device (104) generates a registration acceptance message based on the received SoR information and transmits the registration acceptance message and the SoR information to the UE in response to the completion of registration of the UE (102) in a PLMN. The SoR information containing the list of preferred PLMNs indicates to the UE (102) whether the current network is a preferred PLMN for the requested service.

The UE (102) can perform a mobility-registration procedure providing a new set of S-NSSAIs during the post-initial-registration procedure if the UE (102) requires another service i.e., another S-NSSAI. The UE (102) forwards the information related to new mobility registration procedure to the AF device (108) via the UDM server (106) in order to receive updated SoR information for new service-needs of the user. Such mobility-registration procedure involves a fresh SDM service call, containing the newly requested S-NSSAI information.

FIG. 5 illustrates an exemplary representation of the call flow where steering information containing only preferred list of PLMN is derived based on subscribed S-NSSAIs.

As illustrated in FIG. 5, the call flow (500) comprises one or more steps implemented by the network elements for providing the UE a preferred list of PLMNs based on subscribed S-NSSAIs. The call flow (500) may be described in the general context of computer executable instructions. Generally, computer executable instructions can include routines, programs, objects, components, data structures, procedures, modules, and functions, which perform particular functions or implement particular abstract data types.

The order in which the call flow (500) is described is not intended to be construed as a limitation, and any number of the described method steps can be combined in any order to implement the call flow (500). Additionally, individual steps may be deleted from the call flow (500) without departing from the spirit and scope of the subject matter described herein. Furthermore, the call flow (500) can be implemented in any suitable hardware, software, firmware, or combination thereof.

At step (502), a registration request of a UE (102) is received by an AMF device (104). The UE (102) initiates the registration procedure to register onto a suitable VPLMN by sending registration request to an AMF device (104) in a roaming network. The AMF device (104) performs initial validations as part of the registration. The validation procedure comprises authenticating the UE and validating roaming information of the UE based on received registration request from the UE. The AMF device (104) registers the UE's (102) presence in VPLMN by requesting a UDM server (106) of the UE (102) through UECM service. The UECM service provides information related to the UDM server (106) serving the UE (102), validates subscription information of the roaming UE from the UDM server (106) and registers the presence of the UE (102) in the VPLMN.

At step (504), subscription data is requested from the UDM server (106). The AMF device (104) requests the UDM server (106) to provide subscription data of the roaming subscriber by using subscriber data management (SDM) service. The SDM service provides the requested data from an individual subscriber's subscription to a service consumer. The subscription information provided by the SDM service includes but not limited to data needed for network slice selection, UE registration, network access and mobility management, session management etc. The network slice selection data includes one or more subscribed S-NSSAIs by the UE (102).

At step (506), SoR information is requested by the UDM server (106) from an AF device (108). The UDM server (106) performs subscription validation in order to determine whether the UE (102) is authorized to use one or more subscribed S-NSSAIs in the VPLMN or other VPLMNs. The UDM server (106) requests an AF device (108) to provide SoR information. In one embodiment, the request includes the UE's (102) subscribed S-NSSAIs.

At step (508), the SoR information is received at the UDM server (106). In one embodiment, the AF device (108) determines a list of preferred PLMN that provides the one or more S-NSSAIs as subscribed by the UE (102) based on configuration and stored information of the AF device (108). The AF device (108) also considers the UE's service and business requirements in order to determine of the list of preferred PLMN. Upon determining the suitable SoR information, the AF device (108) transmits the SoR information to the UDM server (106). The SoR information contains a prioritized list of available PLMNs.

At step (510), the SoR information is transmitted to the AMF device (104). The UDM server (106) transmits the received SoR information to the AMF device (104) in response to the subscription request.

At step (512), the SoR information is transmitted to the UE (102). Upon receiving the SoR information, the AMF device (104) generates a registration acceptance message based on the received SoR information and transmits the registration acceptance message and the SoR information to the UE (102) in response to the completion of registration of the UE (102) in a PLMN. The SoR information containing the list of preferred PLMNs indicates to the UE (102) whether the current network is a preferred PLMN for the requested service.

Accordingly, new information containing a list of preferred PLMNs indicates to the UE (102) whether the current network is a preferred PLMN for the requested service. Accordingly, if the current network does not provide the subscribed services, and/or is not the preferred network for the subscribed services, the UE may release the connection and perform PLMN search so that the UE (102) can latch onto the best possible network.

An embodiment of present disclosure eliminates the requirement of manual search of PLMN in a roaming network providing one or more services required or subscribed by the UE, thereby improving UE performance. The automatic determination of preferred PLMNs and one or more S-NSSAIs provided by each PLMN enables a user of the UE to efficiently register onto a PLMN providing all the required or subscribed services without spending much time in searching for suitable network. The present disclosure enables a UE to select a suitable PLMN from the preferred list of PLMNs where the UE is configured to operate on the list of preferred PLMNs only. The present disclosure also enables a UE to select a suitable PLMN from the preferred list of PLMNs and respective S-NSSAIs provided by each of the preferred PLMNs, where the UE is configured to operate on the list of preferred PLMNs and the respective S-NSSAIs.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, programmable gate array (PGA), application specific integrated circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 2, 3, 4 and 5 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of providing steering of roaming (SoR) information to a user equipment (UE), the method comprising:
    receiving, by a serving access and mobility management function (AMF) device, a registration request from the UE;
    registering, by the AMF device, the UE in a visited public land mobile network (VPLMN);
    requesting, by the AMF device, a unified data management (UDM) server of a home public land mobile network (HPLMN), to provide subscribers subscription data;
    receiving, by an application function (AF) device from the UDM server, a request for SoR information, wherein the request for SoR information is based on the request to provide subscribers subscription data from the AMF device, and wherein the request for SoR information includes information related to one or more single-network slice selection assistance information (S-NSSAI);
    determining, by the AF device, SoR information to be provided to the UDM server based on the information related to one or more S-NSSAI;

transmitting, by the AF device, the SoR information to the UDM, server;
receiving, by the AMF device, the SoR information from the UDM server; and
transmitting, by the AMF device, the SoR information to the UE;
wherein the information related to one or more S-NSSAIs included in the request for SoR information is one of S-NSSAIs requested by the UE in the registration request or S-NSSAIs subscribed by the UE, and wherein the SoR information provided by the AF device to the UDM server includes a combination of a prioritized list of available PLMNs and respective S-NSSAI information.

2. The method as claimed in claim 1, wherein registering the UE comprises:
authenticating, by the AMF device, the UE;
validating, by the AMF device, roaming information of the UE based on received registration request from the UE; and
validating, by the AMF device, subscription information of the UE from the UDM Server.

3. The method as claimed in claim 1, wherein authorization of the UE for using the one or more S-NSSAI requested by the UE in one or more roaming network is validated by the UDM server.

4. The method as claimed in claim 1, wherein transmitting the SoR information to the UE comprises:
generating, by the AMF device, a registration acceptance message; and
transmitting the registration acceptance message including the SoR information to the UE.

5. A system for providing steering of roaming (SoR) information to a user equipment (UE), the system comprising:
an access and mobility management function (AMF) device; a unified data management (UDM) server of a home public land mobile network (HPLMN);
the UE; and
an Application Function (AF) device,
wherein the AMF device is configured to:
receive a registration request from the UE,
register the UE in a visited public land mobile network (VPLMN), and
request the UDM server, to provide subscriber's subscription data,
wherein the AF device is configured to:
receive a request for SoR information from the UDM server, wherein the request for SoR information is based on the request to provide subscribers subscription data from the AMF device, and wherein the request for SoR information includes information related to one or more single-network slice selection assistance information (S-NSSAI),
determine SoR information to be provided to the UDM server based on the information related to one or more S-NSSAI, and
transmit the SoR information to the UDM server,
wherein the AMF device is further configured to:
receive the SoR information from the UDM server, and
transmit the SoR information to the UE,
wherein the information related to one or more S-NSSAIs included in the request for SoR information is one of S-NSSAIs requested by the UE in the registration request or S-NSSAIs subscribed by the UE, and
wherein the SoR information provided by the AF device to the UDM server includes a combination of a prioritized list of available PLMNs and respective S-NSSAI information.

6. The system as claimed in claim 5, wherein the AMF device is configured to register the UE by:
authenticating the UE;
validating roaming information of the UE based on received registration request from the UE; and
validating subscription information of the UE from the UDM server.

7. The system as claimed in claim 5, wherein authorization of the UE for using the one or more S-NSSAI requested by the UE in one or more roaming network is validated by the UDM server.

8. The system as claimed in claim 5,
wherein, to transmit the SoR information to the UE, the AMF device is configured to:
generate a registration acceptance message, and
transmit the registration acceptance message including the SoR information to the UE.

* * * * *